Feb. 13, 1951  R. R. ATTRIDGE  2,541,683
SINGLE PHASE INDUCTION MOTOR
Filed June 9, 1949
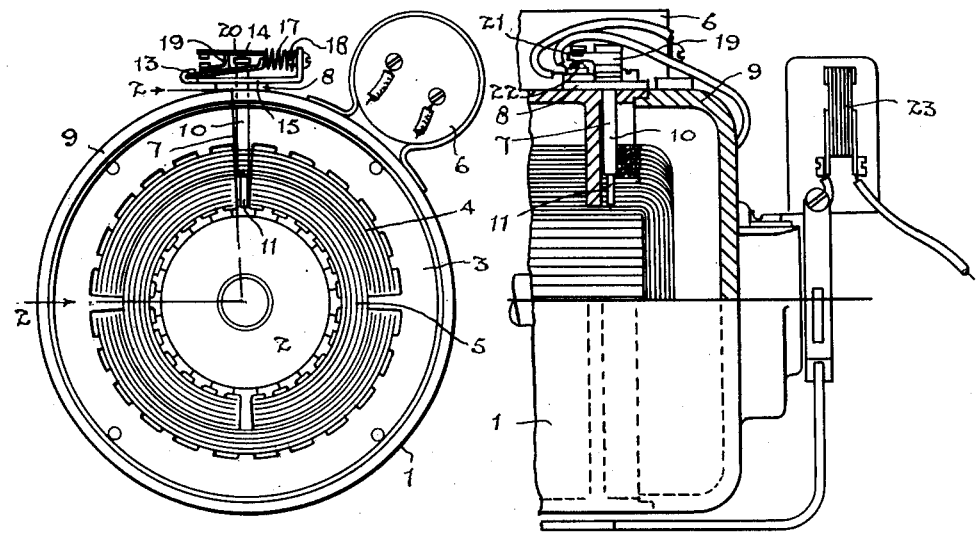
FIG.1.  FIG.2.
FIG.3.
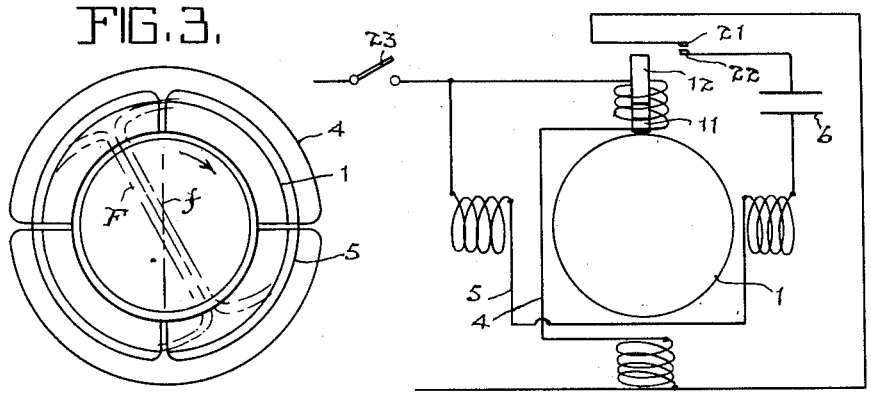
FIG.4.  FIG.6.
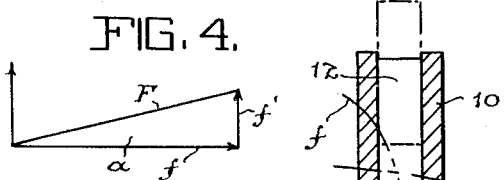
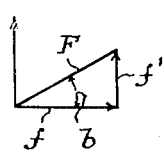
FIG.5.
FIG.7.  FIG.8.
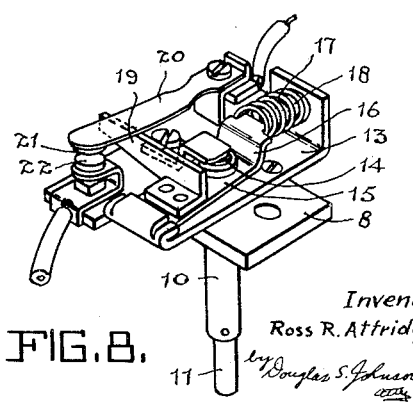
Inventor
Ross R. Attridge
by Douglas S. Johnson
atty.

Patented Feb. 13, 1951

2,541,683

UNITED STATES PATENT OFFICE 2,541,683

SINGLE-PHASE INDUCTION MOTOR

Ross R. Attridge, Toronto, Ontario, Canada

Application June 9, 1949, Serial No. 98,033

5 Claims. (Cl. 318—221)

This invention relates to improvements in single phase induction motors and more particularly to improvements in the means for starting such single phase motors of either the split phase or capacitor start type.

The principal object of the invention is to provide a simple, dependable and efficient and magnetically operated starting device which will operate to close the starting winding of a single phase induction motor instantaneously with the energization of the main winding, and will automatically open the starting winding with a rapid break action before the motor reaches synchronous speed to eliminate excessive arcing at starting, over-heating of the starting windings and other deleterious motor actions which occur with present magnetically or mechanically operated starting devices.

A further important object of the invention is to provide a novel starting switch which will be positively operated by the magentic flux of the motor during starting to open the starting winding as the motor picks up speed as well as to close the starting winding circuit with the first surge of current into the main field winding.

A still further important object is to provide an extremely convenient starting switch mechanism which can be readily incorporated on existing motor designs and in which the operating parts subject to wear are conveniently exposed for maintenance and replacement without requiring a motor to be in any way dismantled.

The principal feature of the invention consists in locating a fixed pole piece in the magnetic circuit of the motor and providing a plunger for operating the controlling switch of the stator winding in the form of a magnetic armature slidably mounted for movement towards and away from the pole piece and normally spring-held therefrom, the pole piece and armature being susceptible to the main magnetic flux of the motor to provide an attractive force between the pole piece and armature sufficient to overcome the resistance of the spring upon the initial current surge of the main motor winding to close the starting winding, and to provide a magnetic force between the pole piece and armature under the changing magnetic flux as the motor approaches synchronous speed to effect the rapid break opening of the starting winding controlling switch.

A further important feature consists in locating the armature and pole piece in a tubular non-magnetic guide extending through the motor casing adjacent one end of the stator core and locating the switch contacts of the starting winding and plunger spring exterior of the casing for maintenance and replacement.

A further important feature consists in providing a novel spring action for operating the armature away from the pole piece to open the starting winding switch.

As a single phase induction motor is not self-starting auxiliary means must be used to supply initial torque. One such method of supplying the initial torque is to split the phase by the combinations of inductance resistance and capacitance connected in a starting winding.

For economy and from the consideration of space the starting winding is of finer wire than the main winding and has a relatively higher resistance, and after starting the starting winding must be open-circuited to prevent high copper losses and impaired motor action.

Previously centrifugal mechanical devices have been employed to open the starting winding upon the motor picking up speed. Such devices are highly unreliable, provide an unbalance in the motor armature and operate over a wide range of speed of the motor. Additionally to their expensive and relatively complicated construction such mechanical devices do not provide a good switch opening action but result in considerable arcing at the switch contacts of the starting winding, with the resulting wear and pitting of the contact surfaces, giving improper operation.

One of the most serious disadvantages of such mechanical devices is the fact that it must be enclosed within the motor casing and for maintenance and servicing the motor must be dismantled for access to the switch contacts and other mechanical parts.

As an improvement over such mechanical devices it has been proposed to utilize a magnetically controlled and actuated device for effecting the opening of the starting winding. Such devices however have relied on the leakage field of the magnetic flux of the motor giving rather haphazard operation, with the switch contacts being gradually opened as the motor assumes speed, providing excessive arcing at the switch contacts of the starting winding circuit.

It is a specific object of this invention to provide a magnetically controlled mechanism for effecting the closing and opening of the starting winding circuit with an extremely positive action to provide a quick make and break between the switch contacts at the desired instants.

Referring to the accompanying drawings, Figure 1 is an end elevational view of a single phase motor with the end plate removed and illustrating a magnetically operated switch mechanism for controlling the starting winding constructed in accordance with my invention.

Figure 2 is a vertical mid-sectional view of the end portion of the motor of Figure 1 on the line 2—2 of Figure 1.

Figure 3 is a diagrammatic view of the end of the motor illustrating shift of motor fluxes during starting of the motor.

Figures 4 and 5 are vector diagrams illustrating the changing direction of the resultant field or flux component of the starting and main windings as the motor picks up speed.

Figure 6 is a circuit diagram illustrating the relationship of the main and starting windings of the capacitor start motor of Figures 1 and 2.

Figure 7 is an enlarged vertical sectional view of the lower portion of my magnetic controller showing the relationship of the operating armature and fixed pole piece.

Figure 8 is a perspective view of my magnetic controller.

With reference to the drawings, I show a single phase motor 1 having a rotor 2 and a stator core 3 on which are wound the main or running winding 4 and the starting winding 5, the starting winding being of a relatively finer wire than the main winding and having a higher resistance.

The particular motor illustrated is of the capacitor start type employing the condenser 6 connected in series with the starting winding 5 to provide a phase difference between the fluxes generated by the starting and running or main windings.

The switch mechanism for effecting the closing and opening of the starting winding circuit comprises my magnetic control device generally designated at 7. This control device has a mounting plate 8 bolted to the exterior of the motor casing 9 adjacent one end of the motor and extending downwardly from this plate is a guide tube 10 of brass or other non-magnetic material. The device is arranged so that the tube 10 extends down into and is enclosed by the main winding at the centre of one of the main winding poles.

Secured in the end of this tube 10 is a pole piece 11 of soft iron or other magnetic material or material having a high magnetic susceptibility.

As shown in Figure 7 particularly, operating within this tube is a plunger in the form of a soft iron armatures 12.

In place of the soft iron or other magnetically susceptible plunger the plunger may of course comprise a non-magnetic rod having only its end formed or provided with a magnetic material.

The upper end of the armature 12 extends through the mounting plate 8 and through the transverse bracket 13 and carries on its upper end a head washer 14. Held at one end of the bracket 13 is a resilient cantilever arm 15 having an opening therein to receive the body of the armature 12 beneath the head washer 14, and formed with an upturned free end 16 which engages in the end of a spring coil 17, the other end of which engages around the stud 18.

With the cantilever arm 15 depressed its end 16 engages the coil spring 17 slightly above the axis of the stud 18 so that the coil spring and cantilever arm form an over-centre type spring action to displace the cantilever arm upwardly to the position of Figure 1 to withdraw the armature 12 away from the pole piece 11.

Carried by the arm 15 is an insulating bracket 19 which engages the spring arm 20 to move the movable contact 21 carried thereby from the fixed contact 22 to normally maintain the starting winding circuit in an open-circuited position.

With reference to Figures 3, 4, 5 and 7, the action of my magnetic control device to close the starting winding during starting of the motor will be understood.

At the instant the main winding 4 is energized by closing the main switch 23 an initial current surge through the main winding creates a magnetic flux $f$ as shown in Figure 3 particularly, which flows across between the main pole windings.

Since the pole piece 11 and armature 12 are enclosed within the main winding coils they form with the stator a part of the magnetic circuit for the flux $f$. Due to the direction of this flux it will be seen, particularly on examination of Figure 7, that the flux $f$ aligns with the pole piece armature to provide an attractive force therebetween. As the initial current surge in the main windings will be high a large initial flux is created and the armature is attracted to the pole piece with sufficient force to overcome the action of the coil spring 17 and the cantilever 15 urging the armature outwardly of the pole piece. Thus the armature is drawn down, drawing the insulating bracket 19 away from the spring arm 20 as the cantilever arm 15 is drawn down by the washer head 14 of the plunger, permitting this spring arm 20 to effect closing of the contacts 21 and 22.

Upon closing of these contacts the starting winding will be included in the motor circuit, giving rise to the flux $f'$ shown particularly in Figures 4 and 5.

As the starting winding circuit includes the large condenser 6 its current and hence its flux will be displaced in phase relative the current and hence flux of the main winding by approximately 90°.

As at starting the current flow in the main winding will be high while the current flow in the starting winding with the relatively higher resistance will be relatively small, and the resulting flux $F$ immediately after closing of the starting winding will be shifted through a relatively small angle $a$.

Upon the motor picking up speed the back EMF in the main winding will reduce the main winding current and hence the main winding flux, so that after a short interval the resultant flux $F$ will have shifted through the angle $b$ as shown in Figure 5.

As shown in Figure 7, the resultant flux $F$ will, after the motor has begun to pick up speed, cut the pole piece and armature substantially transversely to create like poles on the adjacent surfaces of the pole piece and armature to repel the armature from the pole piece.

Actually, as the cantilever arm 15 and spring coil 17 are acting to urge the armature away from the pole piece, the armature will tend to move away from the pole piece as the attractive force therebetween approaches zero, and as this movement is initiated the shift of the resultant flux $F$ will continue to create the repelling force described which assists the spring action to make a very rapid break action of the switch contacts 22 and 23, reducing extended arcing between these contacts, eliminating pitting of their surfaces giving them an extremely long life action.

The use of the pole piece fixed in position is important as it enables an actual repelling force to be set up to urge the armature upwardly to open the switch contacts and there will be no magnetic drag resisting the action of the spring coil 17 and cantilever arm 15 which would retard or lengthen the breaking time of the switch contacts as in previous magnetic devices.

Upon the starting winding opening, the flux of the main winding will not again reach a value sufficient to attract the armature downwardly against the action of the coil spring 17.

In actual operation my switch mechanism affects the opening of the starting winding when the motor reaches approximately 75% of synchronous speed. It will be appreciated that the effective operation of my device in addition to the fixed pole piece resides in the fact that the magnetic members are so placed in the motor as to become a part of the magnetic circuit of the motor so that they experience the same flux changes as that part of the motor in which they are placed and they are not operated merely by leakage magnetism near the air gap between the rotor and stator.

It will further be appreciated that my spring action for urging the plunger or armature 12 outwardly of the pole piece has a very desirable action. When the cantilever 15 and coil 17 are in their normal upwardly displaced position it will require a large force acting on the armature to move the cantilever to permit the armature to move inwardly and allow the switch contacts 22 and 23 to close. On the other hand with the plunger in its inward position, while the cantilever and spring coils 15 and 17 are in a highly unstable position the actual force required to keep the plunger adjacent the pole piece will be less than that force required to initially draw it downwardly and the plunger will remain in its inward position with the contacts closed until the attractive force between the plunger or armature and the pole piece approaches a low value, enabling the starting winding to be maintained in the circuit until the motor gains speed.

A further and very important advantage of my control device is that all operating parts are accessible from without the motor casing and the motor need not be dismantled to repair or replace damaged or worn parts, providing, in addition to improved operation over old type starting devices, material saving in time as well as increased convenience in the maintenance of the motor.

What I claim as my invention is:

1. The combination with an induction motor of the single phase type having a main winding and a normally open starting winding and a switch for closing said starting winding, of spring means normally maintaining said switch open, and a magnetic control device for actuating said switch to close said starting winding upon initial energization of said main winding and to effect the opening of said starting winding as said motor approaches synchronous speed, said magnetic control device comprising a fixed pole piece located adjacent the centre of a main winding pole and forming part of the magnetic circuit for magnetic fluxes of said main and starting windings, and an armature operatively connected with said switch and slidably arranged relative said fixed pole piece to slide inwardly and outwardly of said windings and in the inward position forming part of the magnetic circuit for magnetic fluxes of said main and starting windings, said armature being attracted towards said pole piece upon said armature and pole piece being linked by the flux of said main winding immediately upon energization thereof to close said starting winding switch against said spring means and being moved away from said pole piece while under the influence of the resultant flux of said main and starting windings as said motor approaches synchronous speed to open said starting winding switch.

2. The combination with an induction motor of the single phase type having a main winding and a normally open starting winding of a magnetic control device for closing said starting winding, said control device including a stationary radially extending pole piece located adjacent the centre of a main winding pole, an armature aligned with and slidably mounted to move towards and away from said pole radially of said motor, and a spring urging said armature radially outwardly from said pole piece, said pole piece and armature forming a part of the magnetic circuit of the fluxes of said motor windings to be cut longitudinally by the main winding flux immediately said main winding is energized to magnetically link and draw said armature towards said pole piece against the action of said spring to close said starting winding, and to be cut transversely by the resultant flux of said main and starting windings shifted from said initial main winding flux to effect a rapid separation of said armature and pole piece under magnetic repulsion and spring pressure to open said starting winding with a quick break action.

3. A magnetic control device for closing the starting winding of an induction motor of the split phase or capacitor start type having a main winding and a normally open starting winding, said control device comprising a stationary pole piece located adjacent the centre of a main winding pole, an armature actuator for effecting the closing of said starting winding, and spring means for urging said armature to a position away from said pole piece to open said starting winding, said pole piece and armature forming a part of the magnetic circuit for fluxes of said main and starting windings to be cut by the flux of said main winding in a direction aligned with said armature under magnetic attraction and pole piece to draw said armature towards said pole piece under initial current surge upon energization of said main winding to close said starting winding and to be cut by a resultant flux of said main and starting windings in a direction substantially transverse of said armature and pole piece to effect the movement of said armature away from said pole piece under magnetic repulsion and spring pressure to open said starting winding with a rapid break action.

4. A switch device for the starting winding of an induction motor of the single phase type, comprising a supporting base, a non-magnetic guide tube projecting from said base, a magnetizable member secured at the end of said tube remote from said base, a magnetizable armature slidably mounted in said tube, a normally open switch mechanism operatively connected with said armature to be closed with said armature attracted adjacent said magnetizable member, spring means normally urging said armature away from said magnetizable member, said spring means comprising a spring cantilever arm having a loose connection with said armature permitting limited movement of said armature in said tube relative said cantilever arm, a coil spring engaging the free end of said cantilever arm and having its axis out of alignment therewith to displace said arm in a direction to withdraw said armature from said magnetizable member, and stop means on said armature engaging said arm to constrain said armature to move with said arm in the direction in which it is urged by said coil spring.

5. A device as claimed in claim 4 in which said spring means urging said armature away from said magnetizable member comprises an over-centre type spring action displaced over-centre with said armature away from said magnetizable member and displaced to a near centre highly unstable position with said armature attracted adjacent said magnetizable member, said spring means comprising a cantilever arm operatively connected with said armature, a spring urging said cantilever in a direction to withdraw said armature from said magnetizable member, and means actuated by said cantilever for normally maintaining said normally open switch mechanism in its open position.

ROSS R. ATTRIDGE.

REFERENCES CITED

The following references are of record in the file of this patent:

UNITED STATES PATENTS

| Number | Name | Date |
|---|---|---|
| 934,466 | Scheibe | Sept. 21, 1909 |
| 1,515,478 | Gury et al. | Nov. 11, 1924 |
| 1,696,107 | Bierbower | Dec. 18, 1928 |
| 1,991,113 | Nette | Feb. 12, 1935 |
| 2,075,499 | Buch et al. | Feb. 12, 1935 |
| 2,139,531 | Wedge et al. | Dec. 6, 1938 |
| 2,411,405 | Yuhas | Nov. 19, 1946 |